United States Patent [19]

Boyd et al.

[11] 4,331,768

[45] May 25, 1982

[54] EARTHENWARE-APPEARING GLAZES FOR DINNERWARE

[75] Inventors: David C. Boyd, Corning; Kun-Er Lu; Walter H. Tarcza, both of Painted Post, all of N.Y.

[73] Assignee: Corning Glass Works, Corning, N.Y.

[21] Appl. No.: 243,460

[22] Filed: Mar. 13, 1981

[51] Int. Cl.$^3$ .......................... C03C 1/06; C03C 3/10
[52] U.S. Cl. ...................... 501/18; 428/428; 501/17; 501/20; 501/22; 501/23; 501/25; 501/59; 501/61; 501/62; 501/75
[58] Field of Search ................ 501/18, 17, 22, 23, 501/20, 75

[56] References Cited

U.S. PATENT DOCUMENTS

| | | | |
|---|---|---|---|
| 2,225,160 | 12/1940 | Deyrup | 501/18 |
| 3,862,844 | 1/1975 | Wenning et al. | 501/75 X |
| 4,008,091 | 2/1977 | Wagner et al. | 501/22 X |
| 4,158,080 | 6/1979 | Wexell | 501/23 X |
| 4,158,081 | 6/1979 | Wexell | 501/23 X |

OTHER PUBLICATIONS

Parmelee, C. W.—Ceramic Glazes—Industrial Publications, Chicago, Ill. (1951) p. 236.

Primary Examiner—Helen M. McCarthy
Attorney, Agent, or Firm—Clinton S. Janes, Jr.

[57] ABSTRACT

This invention is directed to the production of glazes exhibiting an earthenware appearance which are particularly suitable for decorating ceramic dinnerware. The glaze composition consists essentially of about 4-8% by weight $SnO_2$ and 4-8% by weight $TiO_2$, the total $SnO_2 + TiO_2$ being about 10-14%, and about 0.025-0.04% by weight $MnO_2$ incorporated into a base frit consisting essentially, as analyzed in weight percent on the oxide basis, of about

| | |
|---|---|
| $SiO_2$ | 37-49 |
| $Al_2O_3$ | 4-7 |
| $B_2O_3$ | 6.5-11 |
| $ZrO_2$ | 0-1.75 |
| $Na_2O$ | 1.75-3.5 |
| $K_2O$ | 0.75-2.5 |
| PbO | 21-32 |
| CdO | 0-0.75 |
| CaO | 1-9 |
| $TiO_2$ | 0-0.35 |
| F | 0-0.6 |

The fired glaze contains crystallites of rutile and cassiterite.

8 Claims, No Drawings

EARTHENWARE-APPEARING GLAZES FOR DINNERWARE

BACKGROUND OF THE INVENTION

There has recently developed a growing mood of informality in home and restaurant dining which has been reflected in the increased use of a wood, accompanied frequently with leather, decor. To augment the ambience created by that motif, dinnerware has been sought demonstrating an earthenware, stoneware, and/or ironstone appearance, and which exhibits high strength, excellent chemical durability, and low loss of toxic elements during use.

Lead-containing glazes have been employed for many years to decorate ceramic bodies with bright, glossy finishes. Most commonly, the glazes are fritted, mixed with a vehicle and, frequently, a binder and deflocculant, and the resultant slurry sprayed or otherwise applied to the surface of the ceramic body. But, to achieve the desired earthenware, stoneware, and/or ironstone appearance, it has been necessary to modify the bright, lead-containing glazes to impart a semi-gloss or even a matte finish thereto while developing a speckled brown hue therein. What has been deemed most desirable is a matte or semi-gloss finish in a warm, off-white color with flecks of a warm brown hue distributed throughout. Nevertheless, inasmuch as the dinnerware may be the object of further decoration, for example, the application of the logo of a restaurant thereon, the color and flecks cannot be so pronounced as to detract attention from that focal point.

Traditionally, the production of glazes demonstrating matte finishes has comprehended two processes: (1) underfiring the glazes; or (2) forming crystallites therein. Underfiring a glaze to produce a matte finish grossly increases the surface area thereof by preventing the frit powders from flowing together to form a non-porous glass over the body. This circumstance increases the susceptibility of the glaze to chemical attack and subsequent release of toxic elements such as lead. The formation of crystallites leads to a roughened surface and, more importantly, can tend to deleteriously alter the composition of the glaze. Hence, the development of crystallites may deplete the frit of a vital constituent, e.g., $SiO_2$, as in the formation of calcium silicate, or it may cause the dilution of the glaze composition with a material which lowers the inherent chemical durability thereof, e.g., ZnO.

A speckled appearance has been imparted to glazes in the past via the incorporation of large (~150 microns) particles of $Fe_2O_3$, $MnO_2$, or "brown glass" which have been coated with an organic plastic to retain them in suspension in the frit slurry, the frit particles conventionally passing a No. 200 U.S. Standard Sieve (74 microns). The large particles are admixed with the glaze slurry at the conclusion of the mixing/melting operations so as to retain their dimensional integrity. The particles are relatively inert in the fused glaze. However, their large size precludes the development of a smooth glazed surface.

SUMMARY OF THE INVENTION

The principal objective of the instant invention is to develop a glaze exhibiting a matte finish, but having a smooth surface, and demonstrating a warm, light brown color with an appealing, deep brown speckled effect. The glaze will also manifest good chemical durability and very low loss of toxic elements during use in contact with acids and alkalies.

That objective can be accomplished through the inclusion of stringently-controlled amounts of $MnO_2$, $TiO_2$, and $SnO_2$ in strictly limited, lead-containing, base glaze compositions. Upon firing, the frit matures to a smooth glaze while very small crystallites of rutile and cassiterite are grown in situ to produce a matte finish without disturbing the chemically durable composition of the base glass. Hence, the $TiO_2$ and $SnO_2$ are sufficiently insoluble in the fused glaze such that they do not degrade the properties thereof. The $MnO_2$ is slightly soluble in the glaze and, because it is an extremely powerful colorant, it will impart an overall light tan tint to the base glaze with localized areas of deep brown color which provide a speckled appearance. Because the amount of $MnO_2$ effective to accomplish those phenomena is so small, the physical and chemical properties of the glaze are virtually unchanged thereby.

The base frit compositions consist essentially, as expressed in weight percent on the oxide basis, of about

| | |
|---|---|
| $SiO_2$ | 37-49 |
| $Al_2O_3$ | 4-7 |
| $B_2O_3$ | 6.5-11 |
| $ZrO_2$ | 0-1.75 |
| $Na_2O$ | 1.75-3.5 |
| $K_2O$ | 0.75-2.5 |
| PbO | 21-32 |
| CdO | 0-0.75 |
| CaO | 1-9 |
| $TiO_2$ | 0-0.35 |
| F | 0-0.6 |

$TiO_2$ and $SnO_2$, each in amounts of about 4-8% by weight, the total thereof being between about 10-14%, will be added to the base frit as will about 0.025-0.04% $MnO_2$.

In general, both the frit and the additives can be utilized in particle sizes passing a No. 200 U.S. Standard Sieve. However, to expedite and improve the glaze flow during firing, the combination may be milled to a finer average particle size. Nevertheless, excessive milling reduces the particle size of the $MnO_2$ to such an extent that the desired deep brown specks will be lost. Accordingly, an average particle size of about 10 microns appears to constitute a practical minimum.

No unusual formulating or processing techniques are necessary to prepare the inventive glazes. The base frit can be compounded from conventional glassmaking ingredients and melted. Because the glass will be utilized in the form of a fine frit, the molten glass may be conveniently poured as a fine stream into a bath of water. The resulting small pieces of glass can then be milled to pass a No. 200 U.S. Standard Sieve. The $TiO_2$, $SnO_2$, and $MnO_2$ are admixed therewith along with, optionally, fillers such as clay. Frequently, a small amount (<5%) of an organic binding agent, such as sugar, will be admixed with the remainder of the formulation. A water slurry of the glaze, commonly containing about 25-30% by weight water, will be prepared for spraying or other means of application. Organic vehicles may be employed, but to no extra advantage to offset the increased cost thereof. The coated substrate is dried to remove the bulk of the vehicle and then fired at about 975°-1075° C. for a sufficient length of time to yield a smooth, non-porous, glazed surface.

The preferred frit compositions consist essentially, as expressed in weight percent on the oxide basis, of about

| | |
|---|---|
| $SiO_2$ | 47–49 |
| $Al_2O_3$ | 4.5–5.5 |
| $B_2O_3$ | 6.5–7.5 |
| $ZrO_2$ | 0.75–1.75 |
| $Na_2O$ | 1.75–2.75 |
| $K_2O$ | 0.75–1.5 |
| PbO | 27.5–29.5 |
| CdO | 0.2–0.5 |
| CaO | 5.75–7 |
| $TiO_2$ | 0.05–0.35 |
| F | 0.2–0.6 |

DESCRIPTION OF THE PREFERRED EMBODIMENTS

The following table reports several frit compositions, expressed in terms of parts by weight on the oxide basis, illustrating the invention. Because it is not known with which cation the fluoride is combined and because the quantity thereof is quite small, it is simply tabulated as fluoride, in accordance with customary glass analysis practice. The actual batch ingredients may comprise any materials, either the oxide or other compound, which, when melted together, will be converted into the desired oxide in the proper proportions.

Melting of the batch components will commonly be conducted at temperatures in the vicinity of 1400° C. in conventional refractory-lined furnaces, such as are employed in the commercial production of glaze frits. The resulting glass will be comminuted to pass a No. 200 U.S. Standard Sieve. Wet ballmilling, utilizing water or an organic medium, will normally be used to effect the desired particle size distribution, although dry ballmilling is also operable. In general, the particle size distribution will fall within the following approximate ranges:

| | |
|---|---|
| <1% | >80 microns |
| 2% | 65–80 microns |
| 38% | 20–65 microns |
| 60% | 3–20 microns |
| <1% | <3 microns | with an average particle size of about 16 microns.

TABLE

| | 1 | 2 | 3 | 4 | 5 | 6 | 7 | 8 | 9 | 10 | 11 |
|---|---|---|---|---|---|---|---|---|---|---|---|
| $SiO_2$ | 48.0 | 48.0 | 45.8 | 41.8 | 41.8 | 41.8 | 41.8 | 41.8 | 37.8 | 37.8 | 45.8 |
| $Al_2O_3$ | 5.0 | 6.4 | 4.0 | 4.0 | 4.0 | 4.0 | 4.0 | 4.0 | 4.0 | 4.0 | 4.0 |
| $B_2O_3$ | 7.0 | 10.0 | 10.0 | 10.0 | 10.0 | 10.0 | 10.0 | 10.0 | 10.0 | 10.0 | 10.0 |
| $ZrO_2$ | 1.2 | 0.8 | — | — | — | — | — | — | — | — | — |
| $Li_2O$ | — | — | 1.2 | 1.2 | 1.2 | 1.2 | 1.2 | 1.2 | 1.2 | 1.2 | 1.2 |
| $Na_2O$ | 2.0 | 2.9 | 3.0 | 3.0 | 3.0 | 3.0 | 3.0 | 3.0 | 3.0 | 3.0 | 3.0 |
| $K_2O$ | 0.8 | 1.2 | 2.0 | 2.0 | 2.0 | 2.0 | 2.0 | 2.0 | 2.0 | 2.0 | 2.0 |
| CaO | 6.3 | 8.7 | 3.0 | 7.0 | 6.0 | 5.0 | 3.0 | 1.0 | 7.0 | 7.0 | 7.0 |
| SrO | — | — | — | — | 1.0 | 2.0 | 4.0 | 6.0 | 4.0 | — | — |
| BaO | — | — | — | — | 2.0 | 4.0 | 8.0 | 12.0 | — | 4.0 | — |
| CdO | 0.4 | 0.3 | — | — | — | — | — | — | — | — | — |
| PbO | 28.4 | 21.6 | 31.0 | 31.0 | 29.0 | 27.0 | 23.0 | 19.0 | 31.0 | 31.0 | 27.0 |
| F | 0.4 | 0.4 | — | — | — | — | — | — | — | — | — |

The degree of fired flow and the thermal expansion of the final glaze can be adjusted through the incorporation of fillers. The amount of filler used will obviously depend upon the nature thereof since adverse effects upon the base formulation must be avoided. Clay is useful in that it acts as a deflocculant. In general, no more than about 5% total of fillers will be incorporated.

The frit, $TiO_2$, $SnO_2$, $MnO_2$, and, optionally, a binding agent and filler will conveniently be mixed together utilizing wet blending to form a homogeneous slurry. If desired, the mixture can be milled together to reduce the particle sizes thereof to an even greater extent in order to further improve the homogeneity of the slurry. It will be appreciated, as was observed above, that wet blending is not vital. Thus, the solid components can be dry blended and then admixed into the vehicle.

EXAMPLE

Frit prepared from the composition of Example 1 in the above table, the most preferred of the inventive compositions, was wet blended with powdered $SnO_2$, $TiO_2$, $MnO_2$, clay, and sugar to produce a formulation having the following approximate composition in parts by weight:

| | |
|---|---|
| Frit | 80.97 |
| $SnO_2$ | 6.00 |
| $TiO_2$ | 6.00 |
| $MnO_2$ | 0.032 |
| Clay | 3.50 |
| Sugar | 3.50 |

A particle size distribution measurement conducted on the mixture indicated about 4% greater than 325 mesh (44 microns), no particles were detected less than 2 microns, and the average particle size was determined to be about 12.5 microns. Part of the mixture was ball-milled for about five additional hours and the quantity of particles having diameters greater than 325 mesh dropped to 3%.

A slurry was prepared from each of those mixtures containing about 27% distilled water. Four small dinner plates marketed by Corning Glass Works, Corning, N.Y., under the trademark PYROCERAM ®, a glass-ceramic having a predominant crystal phase of nepheline and celsian and/or hexacelsian with a coefficient of thermal expansion (0°–300° C.) of about $98 \times 10^{-7}$/°C., were sprayed with each glaze. Two of the plates were fired at 1000° C. and one each at 975° C. and 1025° C. for 60 minutes. The frit mixtures which had been milled the additional five hours yielded glazes which appeared to be very slightly smoother than those milled "conventionally". The glazes fired at 1025° C. seemed to be a little smoother but the glazes on all eight plates were very satisfactory and exhibited the desired earthenware appearance.

Examinations of the fired glazes via scanning electron microscopy have demonstrated the presence of rutile and cassiterite crystals having diameters smaller than one micron.

The coefficient of thermal expansion (25°–300° C.) was measured on the glaze material by pressing the frit mixture into bars, heating the pressed bars to about 950° C. for 15 minutes to form an integral body, and thereafter cooling the bars to room temperature. An average value of about $60 \times 10^{-7}$/°C. was determined.

To test the resistance of the glazes to detergents, the above-described fired plates were subjected to the following practice. A 0.3% by weight aqueous solution of SUPER SOILAX ® detergent, marketed by Economics Laboratories, St. Paul, Minn., was prepared. The solution was heated to 95° C. and the glazed plate immersed therein. The plate was examined after dwell periods of 24, 48, 72, and 96 hours in the hot solution; i.e., the plate was removed, rinsed in distilled water, and dried. A portion of the plate was coated with DYE-CHEK ® dye penetrant, marketed by Magna-Flux Corporation, Chicago, Ill., and the dye allowed to remain in contact with the plate for 20 seconds. In all instances, the stain could be readily removed from the glaze surface using a cloth dampened with the SUPER SOILAX ® brand detergent, thereby indicating the essential lack of any porosity being developed via attack by the detergent. There was no noticeable change in the color of the glaze and the gloss thereof appeared to be virtually intact.

A measurement of heavy metal (cadmium and lead) release was derived utilizing the test method developed by the American Society for Testing Materials (ASTM) and the American National Standard Institute (ANSI), entitled LEAD AND CADMIUM EXTRACTED FROM CERAMIC SURFACES, and designated ANSI/ASTM C 738-78. The release of lead was measured at about 0.7 parts per million (ppm) and the release of cadmium at about 0.07 ppm. Those values are about one order of magnitude lower than the maximum levels permitted by the Federal Food and Drug Administration (7 ppm lead and 0.5 ppm cadmium).

Inasmuch as the glaze manifests a lower coefficient of thermal expansion than the plate material, the glaze behaves as a surface compression layer, thereby providing a composite body exhibiting a greater mechanical strength than the plate alone.

In summary, the inventive glazes demonstrate excellent resistance to detergents, lead and cadmium release values below 7 ppm and 0.5 ppm, respectively, and will customarily exhibit coefficients of thermal expansion (25°–300° C.) between about $60-70 \times 10^{-7}$/°C.

We claim:

1. A smooth, matte finish glaze demonstrating an earthenware appearance, excellent resistance to detergents, and lead and cadmium release values less than 7 ppm and 0.5 ppm, respectively, and containing crystallites of rutile and cassiterite, consisting essentially of a base frit and about 4–8% by weight $SnO_2$, 4–8% by weight $TiO_2$, the total $SnO_2+TiO_2$ constituting about 10–14% by weight, and about 0.025–0.04% by weight $MnO_2$, said base frit consisting essentially, as expressed in weight percent on the oxide basis, of about

| | |
|---|---|
| $SiO_2$ | 37–49 |
| $Al_2O_3$ | 4–7 |
| $B_2O_3$ | 6.5–11 |
| $ZrO_2$ | 0–1.75 |
| $Na_2O$ | 1.75–3.5 |
| $K_2O$ | 0.75–2.5 |
| PbO | 21–32 |
| CdO | 0–0.75 |
| CaO | 1–9 |
| $TiO_2$ | 0–0.35 |
| F | 0–0.6 |

2. A glaze according to claim 1 also containing up to 5% clay.

3. A glaze according to claim 1 wherein said frit consists essentially of about

| | |
|---|---|
| $SiO_2$ | 47–49 |
| $Al_2O_3$ | 4.5–5.5 |
| $B_2O_3$ | 6.5–7.5 |
| $ZrO_2$ | 0.75–1.75 |
| $Na_2O$ | 1.75–2.75 |
| $K_2O$ | 0.75–1.5 |
| PbO | 27.5–29.5 |
| CdO | 0.2–0.5 |
| CaO | 5.75–7 |
| $TiO_2$ | 0.05–0.35 |
| F | 0.2–0.6 |

4. A method for glazing a ceramic substrate with a glaze having an earthenware appearance and demonstrating excellent resistance to detergents and lead and cadmium release values less than 7 ppm and 0.5 ppm, respectively, comprising the steps of:

(a) forming a base frit consisting essentially, as analyzed in weight percent on the oxide basis, of about

| | |
|---|---|
| $SiO_2$ | 37–49 |
| $Al_2O_3$ | 4–7 |
| $B_2O_3$ | 6.5–11 |
| $ZrO_2$ | 0–1.75 |
| $Na_2O$ | 1.75–3.5 |
| $K_2O$ | 0.75–2.5 |
| PbO | 21–32 |
| CdO | 0–0.75 |
| CaO | 1–9 |
| $TiO_2$ | 0–0.35 |
| F | 0–0.6 |

(b) preparing a slurry of said frit plus about 4–8% by weight $SnO_2$ and 4–8% by weight $TiO_2$, the total $SnO_2+TiO_2$ being about 10–14% by weight, and about 0.025–0.04% by weight $MnO_2$, wherein the liquid constitutes about 25–30% by weight of the slurry;

(c) applying said slurry to a ceramic substrate; and, thereafter, (d) firing said slurry at a temperature between about 975°–1075° C. for a sufficient length of time to yield a smooth, matte finish, non-porous glazed surface, said glaze containing crystallites of rutile and cassiterite.

5. A method according to claim 4 wherein said slurry also contains up to 5% of an organic binding agent.

6. A method according to claim 5 wherein said binding agent is sugar.

7. A method according to claim 4 wherein said slurry also contains up to 5% clay.

8. A method according to claim 4 wherein said frit consists essentially of

| | |
|---|---|
| $SiO_2$ | 47–49 |
| $Al_2O_3$ | 4.5–5.5 |
| $B_2O_3$ | 6.5–7.5 |
| $ZrO_2$ | 0.75–1.75 |
| $Na_2O$ | 1.75–2.75 |
| $K_2O$ | 0.75–1.5 |
| PbO | 27.5–29.5 |
| CdO | 0.2–0.5 |
| CaO | 5.75–7 |
| $TiO_2$ | 0.05–0.35 |
| F | 0.2–0.6 |

* * * * *